(No Model.)
A. V. DEMARSH.
WAGON AXLE.
No. 261,592.
Patented July 25, 1882
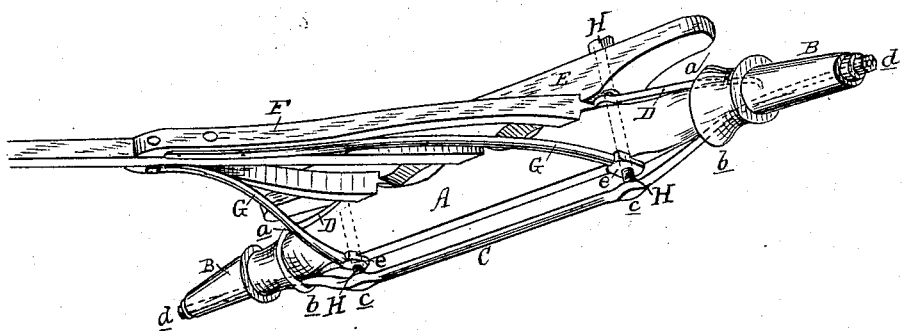

UNITED STATES PATENT OFFICE.

AUGUSTUS V. DEMARSH, OF LESLIE, MICHIGAN.

WAGON-AXLE.

SPECIFICATION forming part of Letters Patent No. 261,592, dated July 25, 1882.

Application filed May 10, 1882. (No model.)

*To all whom it may concern:*

Be it known that I, AUGUSTUS V. DE-MARSH, of Leslie, in the county of Ingham and State of Michigan, have invented new and useful Improvements in Trussed Wagon-Axles; and I do hereby declare that the following is a full, clear, and exact description thereof, reference being had to the accompanying drawing, which forms a part of this specification.

The nature of this invention relates to certain new and useful improvements in the construction of trussed wagon-axles, by means of which the tendency of such axles to break at or near the inner end of the skeins under an upward or downward strain is largely avoided.

The invention consists in the peculiar construction of parts and their combinations, as more fully hereinafter described.

In the accompanying drawing, which forms a part of this specification, the figure being a perspective view of a wagon-axle and adjacent parts, A represents an axle, made of timber in the ordinary way, the ends of which are provided with the skeins B, these skeins being also of the ordinary construction, except that above and below they are enlarged, as shown at $a\ b$, to embrace the truss-rods, which enter the skeins at those points.

C is a truss-rod bent into the form shown, and provided with enlargements or seats $c$, for the purposes hereinafter described. The ends of these rods enter the skeins at each end of the axle at the enlargements $b$, and, lying close along the under side of the arm within the skein, project at the ends beyond the skein, where they are secured by the nuts $d$.

D D represent two other rods, entering the enlargements $a$ of the skein, and within such skein terminate in the downwardly-projecting hook, which enters the timber of the arm. These hooks of the arm D are not secured to the skein, but enter into holes in the axle proper, where they are held by the skein, so that they will aid in strengthening the axle proper without weakening the skein.

E is a bolster, and F the hounds, which are also of the ordinary construction. The hounds are secured to the axle by the braces G and the bolts H. These bolts pass through the bolster and through the exposed ends of the rods D, and through the axle, as shown, and enter the nuts $e$ below the axle. The ends of these bolts project through the nuts and impinge against the enlargements or seats $c$ of the truss, and perform the office of struts for such truss, and these bolts and nuts are so arranged that by turning the bolts in one direction or the other the truss-rod is tightened or loosened, as occasion may require, and the same result may be attained by the use of the nuts on the ends of such truss-rod. The office of the rods D is to prevent the breaking of the axle from any sudden upward strain upon it.

What I claim as my invention is—

1. In combination with an axle and the two skeins thereof, the rods D, secured at the outer ends to the wooden axle, within the skein, and at their inner ends to the bolts which hold the bolster, hounds, axle, and rods together and form the struts for the truss-rod below, substantially as set forth.

2. The combination, with the axle A, the skeins B, the hounds F, brace G, and bolster E, of the two rods D, having hooked ends to enter the axle proper, the truss-rod C, having seats $c$, and passing through the skeins, and the bolts H, passing through and securing together the bolster, hounds, axle, rods, and braces, and also serving to strain against the seats $c$ of the truss-bar, substantially as described.

3. The combination, with the axle A, of the truss-rod C, having seats $c$, the braces G, having screw-threaded ends $e$, and the bolts H, screwing through the ends $e$ and against the seats $c$, substantially as described.

AUGUSTUS V. DEMARSH.

Witnesses:
H. S. SPRAGUE,
F. R. ALDERMAN.